(No Model.)
W. H. PATTON.
MOTOR.
No. 401,756. Patented Apr. 23, 1889.
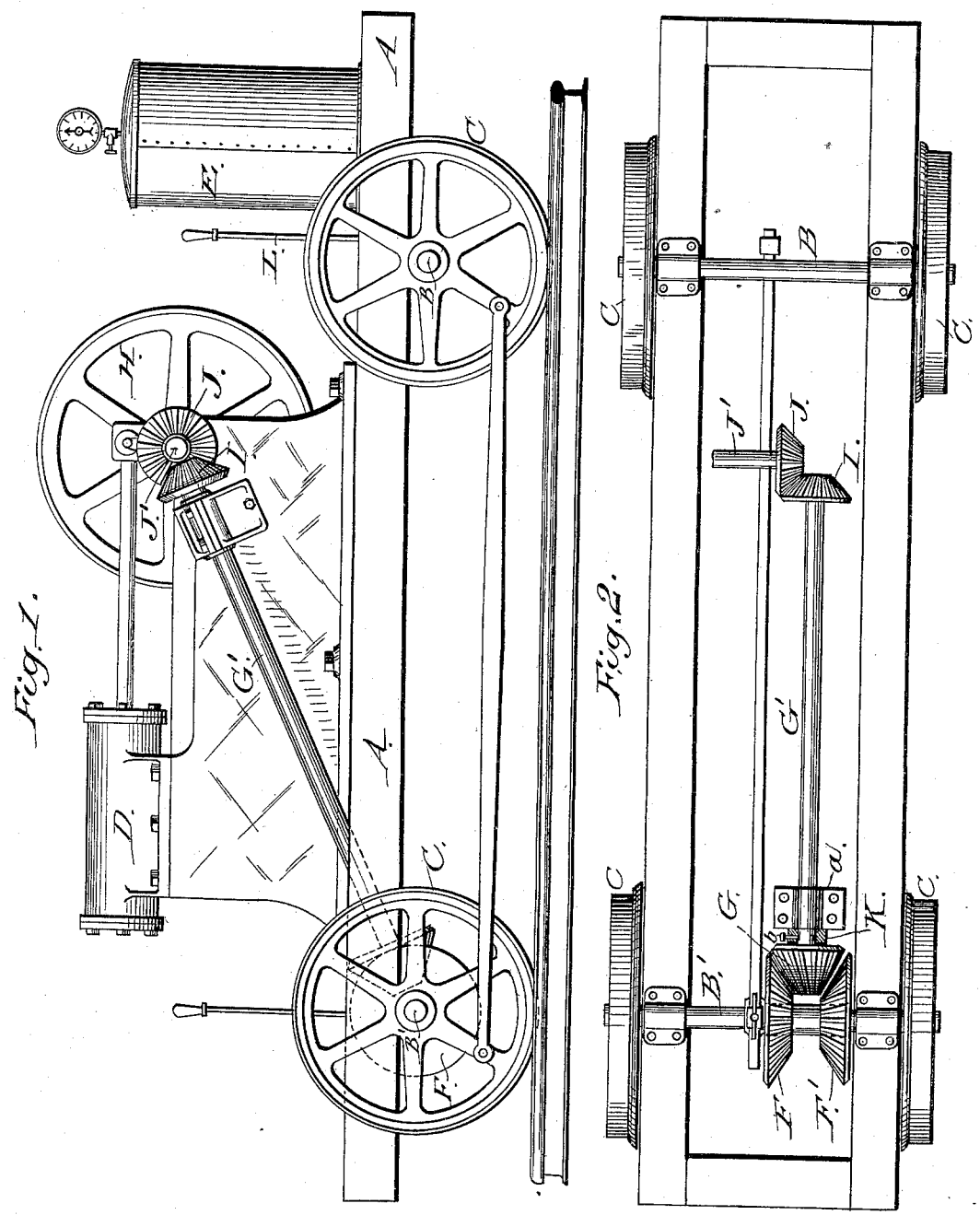
WITNESSES,
T. W. Fowler
W. H. Patterson
INVENTOR.
Wm. H. Patton
per A. H. Evans & Co.
Attorneys.

UNITED STATES PATENT OFFICE.

WILLIAM H. PATTON, OF PUEBLO, COLORADO.

MOTOR.

SPECIFICATION forming part of Letters Patent No. 401,756, dated April 23, 1889.

Application filed November 16, 1887. Renewed March 5, 1889. Serial No. 302,017. (No model.)

*To all whom it may concern:*

Be it known that I, WILLIAM H. PATTON, a citizen of the United States, residing at Pueblo, in the county of Pueblo and State of Colorado, have invented new and useful Improvements in Motors, designed more especially for use in street-car railways, of which the following is a clear and correct description, reference being had to the accompanying drawings, making a part of this specification, in which—

Figure 1 represents a side elevation of a car with my improvements attached. Fig. 2 is a plan view of the same.

The object of my present invention is the economical propulsion of street-cars; and it consists of a combination of devices hereinafter explained and claimed, and it is an improvement on my application filed by me May 27, 1887, Serial No. 239,530, allowed August 30, 1887.

To enable others skilled in the art to make and use my invention, I will proceed to describe the manner in which I have carried it out.

In the drawings, A A represent the frame of a car-truck, B B' the axles, and C C the wheels. On the said frame is supported the drive-power D, as described in my former specification. As a drive-power, I prefer to use a gas-engine and a storage-tank, E, in which the gas will be compressed at intervals and supplied to the engine, as described in my former application above referred to.

On the axle B, I mount the two bevel-gears F F', and between these two gears I place another bevel-gear, G, mounted on the lower end of a flexible shaft, G', which is secured in suitable bearings and extends on an upward incline and at right angle to the line of the axle to the drive-wheel H, where it is provided with another bevel-gear, I, which engages with the bevel-gear J on the axle J' of the drive-wheel, as shown in Fig. 2. It is evident from this description that if the flexible shaft G' be kept continuously revolving and the bevel-gear F be kept in the position shown in Fig. 2 the car will be driven in one direction; but if the bevel-gear F be moved away and the gear F' be moved to engage the bevel-gear G the movement of the wheels will be reversed and the car will be driven in the opposite direction. To accomplish this result, I mount the gear-wheels F and F' on a sleeve having a lateral movement on the axle B', and connect the gears together by a boxing, (not shown,) so as to cause the two gears to move in unison with each other on the axle when operated upon by means of the lever L, as shown in Fig. 1.

As car-trucks are mounted on springs placed in the axle-bearing boxes, there must be a constant vertical movement of the axle B and of the shaft G' in relation to the said axle, and the distance between the bevel-gears G and I on either end of the shaft G' is therefore constantly changing. It has been attempted to overcome this difficulty by means of a shaft provided with a "slip-joint," so as to compensate for this constantly-varying length of the shaft; but this was found impracticable, as the shaft thus constructed failed to hold the gears up to their engagement. To overcome this difficulty successfully is the essential feature of my present invention; and hence I use a flexible shaft, G', which sags slightly toward its middle, and by its flexible yielding it is found by actual tests to fully compensate for the vertical movement arising from the use of the springs under the car-axles.

In mounting the bevel-gear G on the shaft G', I place a close collar, K, on the shaft between the bearing $a$ and the gear G, and this collar is rigidly attached to the shaft by means of a thumb-screw, $b$, which turns freely with the shaft and thus holds the flexible shaft snugly to its work. To compensate for any wear on the bevel-gear G, it will only be necessary to loosen collar K and draw slightly on the flexible shaft, so as to lengthen that portion lying outside the collar and connecting with the gear, thus giving the gear G a slight thrust forward to again bring it into proper engagement with the gears F F'.

Having thus described my invention, what I claim as new, and desire to secure by Letters Patent, is—

1. The frame A of a car-truck, and the axle B', provided with the sliding bevel-gears F F', in combination with the bevel-gears G and I, mounted on a flexible shaft, G', the bevel-gear J, mounted on the shaft J', and a motive power for operating the same, substantially as and for the purpose herein described.

2. The axle B', provided with the sliding bevel-gears F F', in combination with the bevel-gears G and I, mounted on a flexible shaft supported in proper bearings, and provided with a close collar held in place by means of a thumb-screw and adapted to hold the bevel-gear G up to its work, substantially as herein set forth.

3. The flexible shaft G', supported in proper bearings, provided with the bevel-gears G and I, in combination with the collar K, secured to the said shaft between the bearing and gear G, substantially as and for the purpose set forth.

WILLIAM H. PATTON.

Witnesses:
 JOE C. ELWELL,
 T. WALTER FOWLER.